United States Patent Office 3,502,963
Patented Mar. 24, 1970

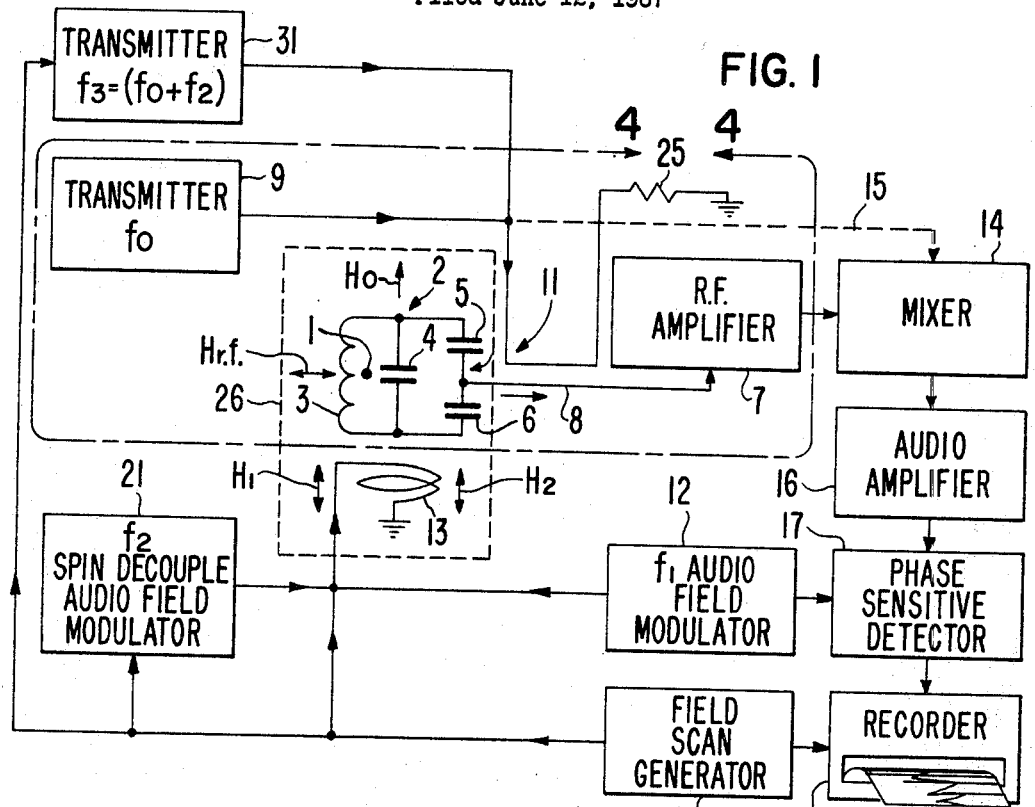
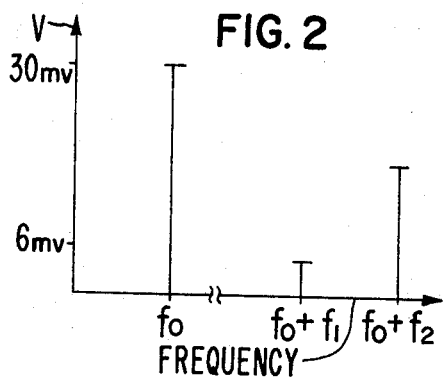
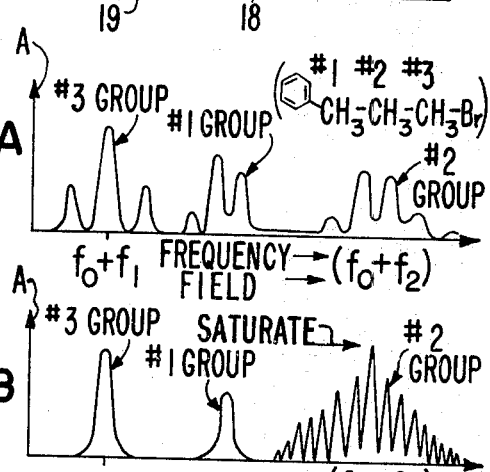
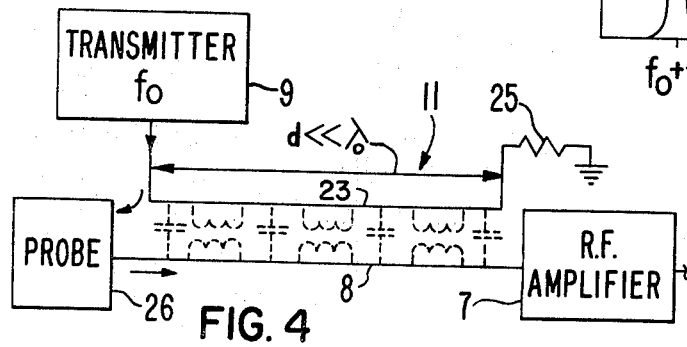
INVENTOR.
LLOYD F. HLAVKA
BY
ATTORNEY

3,502,963
**SINGLE COIL NUCLEAR RESONANCE SPECTROM-
ETER HAVING THE RADIO FREQUENCY EX-
CITATION DIRECTIONALLY COUPLED INTO
THE COIL**
Lloyd F. Hlavka, Palo Alto, Calif., assignor to Varian
Associates, Palo Alto, Calif., a corporation of California
Filed June 12, 1967, Ser. No. 645,393
Int. Cl. G01n 27/78
U.S. Cl. 324—.5    3 Claims

ABSTRACT OF THE DISCLOSURE

A single-coil nuclear resonance spectrometer is disclosed. The spectrometer employs a single resonance circuit for simultaneous excitation and detection of nuclear resonance of a sample under analysis. A radio frequency transmitter transmitting a carrier frequency and a radio frequency receiver are both connected to the same resonant circuit. The polarizing magnetic field is modulated at a first audio frequency to produce a first sideband of the carrier for observing resonance of a first group of nuclei in the sample under analysis. The polarizing magnetic field is modulated at a second audio frequency to produce a second sideband of the carrier for producing saturated resonance of a second group of nuclei which are spin-coupled to the first group, to decouple the resonances of the two groups. The carrier amplitude is relatively strong in order to produce sufficient amplitude in the second sideband for saturating resonance of the second group. A directional coupler is connected in circuit between the resonant circuit and the receiver to permit a relatively strong carrier to be applied to the resonant circuit without coupling an excessive carrier component into the receiver, thereby preventing overloading of the radio frequency amplifiers in the receiver.

Description of the prior art

Heretofore, it has been proposed to employ a single resonant coil connected to both a radio frequency carrier signal transmitter and a radio frequency receiver for observing nuclear resonance of samples under analysis in a polarizing magnetic field. In this prior system, the polarizing magnetic field was modulated at a first audio frequency to produce resonance of a group of nuclei in the sample at a first sideband of the carrier frequency. The carrier signal was coupled into the resonant coil and into the receiver by a coupling capacitor. As a result, the carrier signal amplitude had to be kept less than about 6 millivolts to prevent overloading the amplifiers in the receiver. This carrier level was too low to permit optimum use of field modulation at a second audio frequency to produce saturated resonance of a second nuclear group for spin decoupling.

Summary of the present invention

The principal object of the present invention is the provision of an improved nuclear resonance spectrometer having a spin decoupling capability.

One feature of the present invention is the provision, in a single-coil double nuclear resonance spectrometer, of a directional coupler connected in circuit between the single-coil and the receiver for coupling radio frequency signals to the single-coil at relatively high amplitude, for exciting double resonance of the sample, while keeping the RF signal amplitude, as coupled into the receiver, at a relatively low amplitude, whereby overloading of the radio frequency amplifiers in the receiver is prevented when exciting double resonance in use.

Another feature of the present invention is the same as the preceding feature wherein the directional coupler comprises a four terminal network having two sections of parallel stripline capacitively and inductively coupled together over a length less than a tenth of a wavelength long at the carrier frequency, whereby an extremely simple directional coupler is obtained which is especially suited for fabrication by printed circuit techniques.

Other features and advantages of the present invention will become apparent upon a perusal of the following specification taken in connection with the accompanying drawings wherein:

Brief description of the drawings

FIG. 1 is a schematic block diagram of a nuclear resonance spectrometer employing features of the present invention, FIG. 2 is a plot of radio frequency voltage V in millivolts versus frequency showing the carrier and sideband signals employed in the spectrometer, FIGS. 3a and 3b are resonance spectra without and with spin decoupling, respectively, and FIG. 4 is an enlarged detail view, partly in block diagram form, of a portion of the circuit of FIG. 1 delineated by line 4—4.

Description of the preferred embodiments

Referring now to FIG. 1, there is shown a nuclear resonance spectrometer employing features of the present invention. A sample of matter 1 to be analyzed is disposed in a polarizing magnetic field $H_0$ of, for example, 14.1 kg. A radio frequency resonant circuit 2, comprising parallel resonant inductive coil 3 and capacitor 4, is tuned to the nuclear resonant frequency of the sample, i.e., protons, in the polarizing field $H_0$, which for a 14.1 kg. field is about 60 mHz. A pair of radio frequency voltage dividing capacitors 5 and 6 are connected across the tuned circuit 2 for impedance matching the tuned circuit 2 to the input of a radio frequency amplifier 7 to which it is connected via line 8.

A radio transmitter 9 transmits a carrier frequency signal at $f_0$ to the tuned circuit 2 via a directional coupled 11 and line 8. The directional coupler 11, more fully described below with regard to FIG. 4, couples a relatively strong carrier signal into the tuned circuit, as of 30 multivolts, while keeping the level of the carrier signal coupled into the receiver 14 db below that level coupled to the tuned circuit 2 to prevent overloading the radio frequency amplifier circuits in the amplifier 7.

The carrier frequency $f_0$ is displaced from the nuclear resonance frequency of the sample 1 by some convenient audio frequency $f_1$ such as 5 kHz. As used herein, "audio frequency" is defined to include the audio frequency band plus those frequencies up to 2 mHz.

A first audio frequency field modulator 12 modulates the polarizing field at the predetermined convenient audio frequency $f_1$, by which the carrier frequency was displaced from resonance of the sample 1, to produce resonance of the sample 1 at a first F.M. sideband frequency $(f_0+f_1)$ of the carrier signal, see FIG. 2. The field modulator 12 feeds its output signal at $f_1$ to a coil 13 which produces an audio magnetic field $H_1$ parallel to the polarizing field $H_0$ and superimposed thereon for intensity modulating same. The F.M. modulation index is set at a low value as of 0.5.

The resonance signal emanating from the sample at the first sideband frequency is picked up by the tuned circuit 2 and fed via line 8 to the RF amplifier 7 wherein it is amplified and fed to one input terminal of mixer 14. A sample of the carrier signal is fed to mixer 14 for mixing with the sideband resonance signal. The carrier may be fed to the mixer 14 via an external line, as indicated by dotted line 15, or it may come through on line 8, as a leakage signal with the resonance signal. The output of the mixer 14 is a resonance signal at the audio modulation frequency $f_1$ which is fed to an audio amplifier 16 and thence to one input of a phase sensitive detector 17. A sample of the audio field modulation frequency $f_1$ is fed to the other input terminal of the phase sensitive detector to produce a DC resonance output signal.

The DC resonance signal is fed to the Y terminal of an X-Y recorder 18 and recorded as a function of a scan signal derived from a field scan generator 19. The field scan generator scans the polarizing field intensity to scan the resonance spectrum through the observing frequency of resonance $(f_0+f_1)$ to obtain an output spectrum. The scan generator 19 feeds its slowly changing DC current into the field modulating coils 13 to produce the scan field. A typical output resonance spectrum is depicted in FIG. 3a for the protons in 3 Br propyl benezene.

As seen from the resonance spectrum of FIG. 3a, the resonance line of a first group of the sample, i.e., the protons in the first $CH_3$ group of (3-bromopropyl)-Benzene, is split into three lines by the nuclear spin coupling to the nuclei of a second group of nuclei of the sample, i.e., the protons in the second $CH_3$ group of the sample. Likewise the resonance line group is split by spin coupling to the second group.

Spin coupling between the resonance of the first and second groups and between the second and third groups of nuclei is eliminated by spin decoupling, i.e., producing saturated resonance of the second group of nuclei while observing resonance of the first and third groups of nuclei. With spin decoupling, the output spectrum for each of the first and third groups reduces to a single resonance line as shown in FIG. 3b.

Spin decoupling is obtained in the spectrometer of FIG 1 by modulating the polarizing magnetic field $H_0$ with a second audio frequency $f_2$ obtained from spin decoupler audio modulator 21 and of such a frequency to produce a second sideband of the carrier $f_0$ at the resonance frequency of the second group of nuclei, i.e., $(f_0+f_2)$. since saturated resonance is desired at $(f_0+f_2)$ for spin decoupling, the carrier signal $f_0$ is raised to an amplitude of about five times its normal value as employed for non-spin decoupling resonance. Also the spin decoupling audio modulation signal is set at an amplitude substantially above the level of the resonance observing field modulation at $f_1$. The result is a strong spin decoupling resonance exciting sideband of the carrier at $(f_0+f_2)$, see FIG. 2.

The spin decoupled spectrum of FIG 3b is obtained by field scanning the spectrum through the fixed resonance observing frequency at $(f_0+f_1)$ via scan generator 19 and coil 13 while producing saturated resonance of the second group at $(f_0+f_2)$. Since the second group is also part of the spectrum being scanned by the changing polarizing magnetic field, the frequency of $f_2$ must be also scanned at the same rate to stay on the resonance line of the second group. Accordingly, the spin decoupling audio field modulator 21 is a voltage tunable oscillator and a sample of the field scan signal from scan generator 19 is employed to scan the frequency of $f_2$ to stay on the resonance line of the second group. The result is the spin decoupled spectrum of FIG 3b. The scanned spin decoupler forms the subject of and is claimed in copending application S.N. 645,391 filed June 12, 1967 and assigned to the same assignee as the present invention.

Due to the relatively high amplitude of the carrier signal $f_0$ fed to the sample to produce the sufficiently high amplitude second sideband $(f_0+f_2)$ required for saturated resonance used for spin decoupling, the directional coupler 11 is necessary to prevent overloading of the radio frequency amplifier 7.

Referring now to FIG. 4, the directional coupler 11 is shown in greater detail. The coupler 11 includes a pair of parallel printed circuit striplines 23 and 8, each as of 80Ω characteristic impedance. The two lines 23 and 8 are closely spaced to provide substantial distributed capacity and inductance therebetween over a length $d$ which is about $\frac{1}{50}$ of a wavelength long at the operating frequency $f_0$. The transmitter 9 is connected to one end of the input line 23 and the other end of the input line 23 is terminated in a resistive matched load 25. The other parallel line 8 has one end connected to the tuned circuit 2 within the prob structure 26, as more fully shown in FIG. 1. The other end of the second parallel line 8 is connected to the input terminal of the radio frequency amplifier 7.

In operation, the directional coupler 11 couples the transmitter signal into the probe 26 with a loss in signal strength of −30 db. However, the signal strength of the carrier $f_0$, as coupled into the input of the receiver 7, is down by −44 db. Thus, the carrier signal $f_0$, as coupled to the probe 26, has a strength 14 db higher than the carrier signal coupled to the receiver. On the other hand, resonance signals generated within the probe 26 are coupled via line 8 to the amplifier 7 with only a 0.1 db loss in signal strength.

As an alternative to the field modulation method of spin-decoupling, and thus far described in FIG. 1, saturated resonance of the second group of nuclei for spin decoupling may be excited by a second relatively strong radio frequency signal $f_3$, where $f_3=(f_0+f_2)$, fed into the single coil 2 from a source 31 via the same input terminal of the directional coupler 11 as employed for coupling transmitter 9. The directional coupler 11 serves to keep the signal strength of the second radio frequency signal $f_3$ relatively low as coupled into the RF amplifier 7 to prevent overloading and blocking of the RF amplifier circuits. In this alternative method for exciting spin-decoupling double resonance, the second field modulator 21 need not be used and the frequency $f_3$ may be scanned instead of the second field modulation frequency $f_2$ to stay on resonance of the group to be decoupled.

One advantage of the particular stripline directional coupler 11 is that it is especially well suited for ease of manufacuere by conventional printed circuit techniques.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a nuclear resonance spectrometer, means forming a resonant circuit for applying a radio frequency magnetic field to a first group of nuclei in a nuclear resonance sample of matter to be analyzed in a polarizing magnetic field, said resonant circuit means also serving to pick up the resonance signal emanating from the first group of nuclei, receiver means connected to said resonant circuit means and containing radio frequency amplifiers for amplifying and detecting the resonance signal to produce an output resonance signal, means for producing resonance of a second group of nuclei in the sample at a second radio frequency for varying the strength of the spin coupling of said first and second groups of nuclei, the improvement comprising, means forming a directional coupler connected in circuit between said resonant circuit means and said receiver means for applying a larger radio frequency signal to said resonant circuit means than to said receiver means to produce resonance of the second group of nuclei, whereby overloading of the radio frequency amplifiers in said receiver means is prevented in use.

2. The apparatus of claim 1 wherein said directional coupler means includes first and second adjacent striplines capacitively and inductively coupled together along their axially coextensive regions by distributed capacity and inductance between said pair of lines, said axially coextensive region being less than a tenth of a wavelength long at the frequency of the applied radio frequency field and wherein said radio frequency signal is applied to one end of said first stripline, and said receiver means and said resonant circuit means are connected to the opposite ends of said second stripline.

3. The apparatus of claim 1 including means for modulating the polarizing magnetic field at a first audio frequency to produce the resonance of the first group of nuclei in the sample under analysis at a first sideband of the applied radio frequency field, means for modulating the polarizing magnetic field at a second audio frequency for producing the resonance of the second group of nuclei in the sample at a second sideband of the applied radio frequency magnetic field.

References Cited

UNITED STATES PATENTS 3,215,930  11/1965  Turner _____ 324—0.5

OTHER REFERENCES

Freeman et al.: The Effect of a Second Radio Frequency Field on High Resolution Proton Magnetic Resonance Spectra, Proc. Opt The Physical Society, April 1962, pp. 794–807.

Baker et al.: Two Synthesizer Nunclear Spin Decoupling INDOR Spectroscopy, Rev. of Sci. Instr., 34(3), pp. 238–346, March 1963.

RUDOLPH V. ROLINEC, Primary Examiner

M. J. LYNCH, Assistant Examiner